United States Patent
Garrett et al.

(10) Patent No.: US 9,167,005 B2
(45) Date of Patent: Oct. 20, 2015

(54) METHOD AND SYSTEM FOR SUPPORTING VISITOR ACCESS VIA A BROADBAND GATEWAY

(75) Inventors: David Garrett, Tustin, CA (US); Jeyhan Karaoguz, Irvine, CA (US); Xuemin Chen, Rancho Santa Fe, CA (US); Wael William Diab, San Francisco, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 507 days.

(21) Appl. No.: 12/981,966

(22) Filed: Dec. 30, 2010

(65) Prior Publication Data

US 2011/0302632 A1 Dec. 8, 2011

Related U.S. Application Data

(60) Provisional application No. 61/351,696, filed on Jun. 4, 2010.

(51) Int. Cl.
| | |
|---|---|
| *H04L 29/06* | (2006.01) |
| *H04W 12/08* | (2009.01) |
| *G06Q 20/10* | (2012.01) |
| *H04L 12/857* | (2013.01) |
| *H04L 29/08* | (2006.01) |

(Continued)

(52) U.S. Cl.
CPC .............. *H04L 65/102* (2013.01); *G06F 21/10* (2013.01); *G06Q 20/10* (2013.01); *G06Q 30/0226* (2013.01); *H04L 47/2491* (2013.01); *H04L 63/0281* (2013.01); *H04L 63/10* (2013.01); *H04L 63/205* (2013.01); *H04L 65/40* (2013.01); *H04L 67/10* (2013.01); *H04W 12/08* (2013.01); *H04L 41/32* (2013.01); *H04L 41/5019* (2013.01)

(58) Field of Classification Search
CPC .............. H04L 63/101–63/105; H04L 65/102; H04W 12/08
See application file for complete search history.

(56) References Cited

U.S. PATENT DOCUMENTS

| | | | | |
|---|---|---|---|---|
| 6,789,110 B1 * | 9/2004 | Short et al. | ..................... | 709/221 |
| 7,117,526 B1 * | 10/2006 | Short | ................................ | 726/5 |

(Continued)

FOREIGN PATENT DOCUMENTS

| | | | | | |
|---|---|---|---|---|---|
| WO | WO 2005/110208 | * | 11/2005 | ............... | A61B 5/00 |
| WO | WO 2008/007884 | * | 1/2008 | ............. | H04L 12/22 |

*Primary Examiner* — Robert Leung
(74) *Attorney, Agent, or Firm* — Foley & Lardner LLP; Christopher J. McKenna; Paul M. H. Pua

(57) ABSTRACT

A method and system are provided in which a broadband gateway may enable a guest or visitor to access content available to the broadband gateway. The content may be received by the broadband gateway through one or more of a plurality of network access service providers that may provide separate physical layer access to the broadband gateway. After a visitor's device is connected to the broadband gateway, the broadband gateway may classify the device. Based on the classification, the device may be authorized to access a portion of the content received. Once the authorization process is complete, the appropriate content may be made available and transferred to the device. The authorization process may include the authentication of a device identifier and/or a user identifier. The authorized access may be time-limited, but may be renewed or enabled when a request is received within a determined period of time.

20 Claims, 10 Drawing Sheets

(51) Int. Cl.
*G06Q 30/02* (2012.01)
*G06F 21/10* (2013.01)
*H04L 12/24* (2006.01)

(56) References Cited

U.S. PATENT DOCUMENTS

| | | | |
|---|---|---|---|
| 7,720,044 B1* | 5/2010 | Rainisto | 370/349 |
| 2001/0038609 A1* | 11/2001 | Yamaguchi | 370/229 |
| 2003/0046541 A1* | 3/2003 | Gerdes et al. | 713/168 |
| 2003/0105971 A1* | 6/2003 | Angelo et al. | 713/200 |
| 2003/0191946 A1* | 10/2003 | Auer et al. | 713/182 |
| 2004/0128557 A1* | 7/2004 | Sakushima et al. | 713/202 |
| 2004/0203748 A1* | 10/2004 | Kappes et al. | 455/432.1 |
| 2005/0208952 A1* | 9/2005 | Dietrich et al. | 455/456.1 |
| 2005/0233744 A1* | 10/2005 | Karaoguz et al. | 455/432.3 |
| 2005/0241004 A1* | 10/2005 | Pyhalammi | 726/29 |
| 2006/0031436 A1* | 2/2006 | Sakata et al. | 709/221 |
| 2006/0242018 A1* | 10/2006 | Shulman et al. | 705/14 |
| 2007/0186106 A1* | 8/2007 | Ting et al. | 713/168 |
| 2010/0223660 A1* | 9/2010 | Scott et al. | 726/4 |
| 2010/0293590 A1* | 11/2010 | Dandabany | 726/1 |

\* cited by examiner

METHOD AND SYSTEM FOR SUPPORTING VISITOR ACCESS VIA A BROADBAND GATEWAY

CROSS-REFERENCE TO RELATED APPLICATIONS/INCORPORATION BY REFERENCE

This application claims the benefit of U.S. Provisional Patent Application 61/351,696, filed on Jun. 4, 2010.

This application also makes reference to:

U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010; and
U.S. patent application Ser. No. 12/982,414 filed on Dec. 30, 2010.
U.S. patent application Ser. No. 12/981,733 filed on Dec. 30, 2010.

Each of the above stated applications is hereby incorporated herein by reference in its entirety.

FIELD OF THE INVENTION

Certain embodiments of the invention relate to broadband access. More specifically, certain embodiments of the invention relate to supporting visitor access via a broadband gateway.

BACKGROUND OF THE INVENTION

As the use of home networks grow in popularity, the capabilities of today's gateway devices may not be adequate to support certain applications and content to be provided through such networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for supporting visitor access via a broadband gateway, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
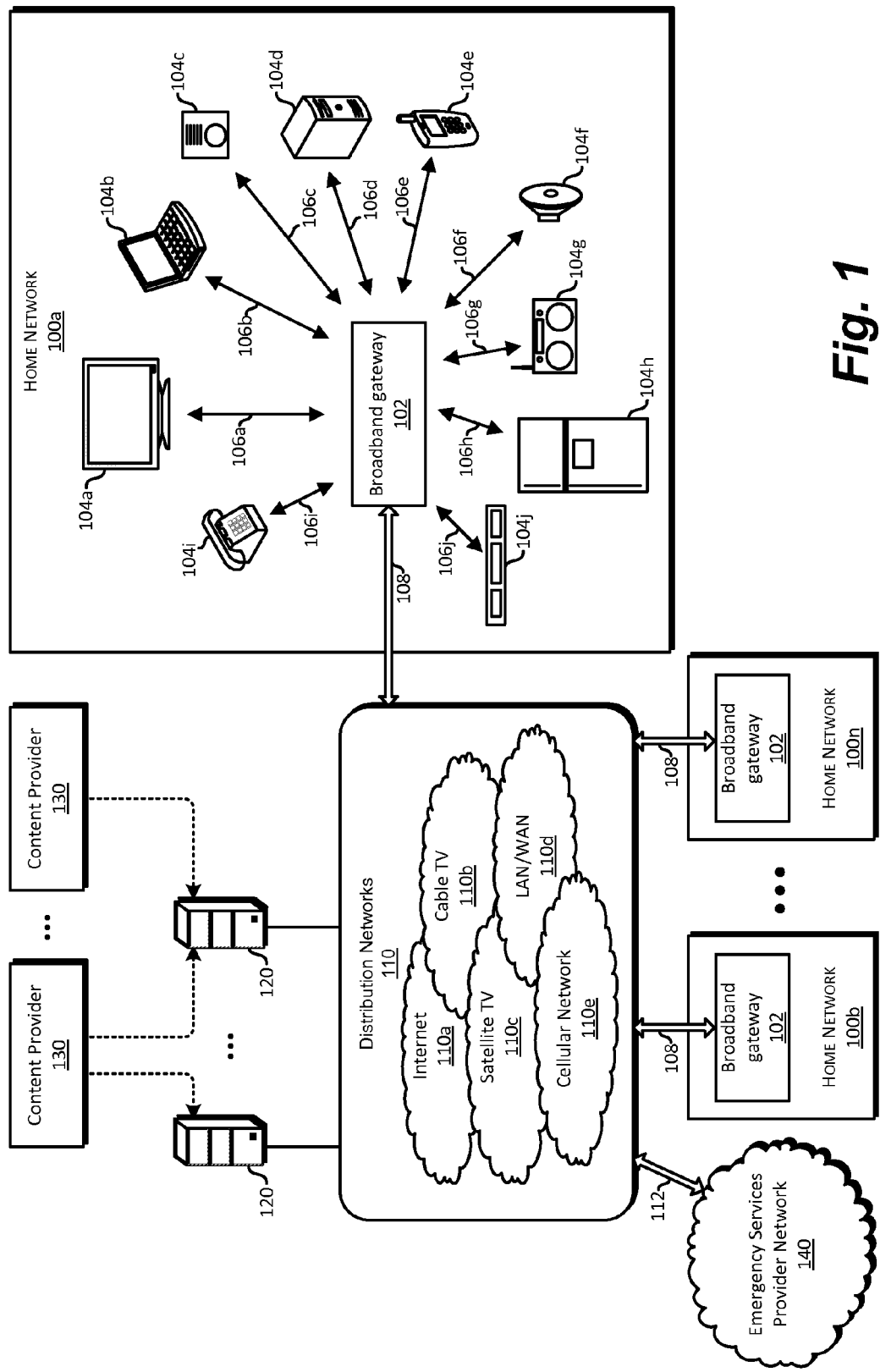
FIG. 1 is a block diagram illustrating an exemplary communication system that comprises a home network serviced by a broadband gateway, in accordance with an embodiment of the invention.

Certain embodiments of the invention can be found in a method and system for supporting visitor access via a broadband gateway. In accordance with various embodiments of the invention, the broadband gateway may enable guest or visitor access to content available to the broadband gateway. The content may be received by the broadband gateway through one or more of a plurality of network access service providers, each of which provides a separate physical layers access to the broadband gateway. A physical layer may refer to an Open Systems Interconnect (OSI) layer 1, for example. After a visitor's device, such as a wireless device, for example, is communicatively coupled to the broadband gateway, the broadband gateway may classify the device. The device may connect to the broadband gateway through a home network supported by the broadband gateway. Based on the classification, the device may be authorized to access a portion of the content received, or that may be received, by the broadband gateway. Once the authorization process is complete, the appropriate content may be made available and communicated to the device for user consumption. The authorization process may include the authentication of a device identifier and/or a user identifier. The authorized access to the content may be time-limited, but may be renewed or enabled when a request is received by the broadband gateway within a determined period of time.

Providing visitor access via a broadband gateway may be beneficial to a visitor or guest, to a host, and/or to those providing content and/or services to the host. Generally, a visitor or guest has limited or no access to the content and/or services that may be available to the host. Limited access typically occurs when a visitor, a family member or a friend, for example, watches a television program received from a cable or satellite provider in the host's television. The visitor may not have access to that content or any other content available to the host in his or her own device, such as laptop computer, smartphone, tablet computer, or the like. When, as described above, a broadband gateway is available to receive content through more than one network access service provider, the visitor may be deprived of convenient and/or private access to a large and varied amount of content from a wide range of sources that may available to the host.

By enabling a visitor to access at least a portion of the content received by the broadband gateway, even when the visitor is not a customer of those entities associated with providing content and/or services to the host, such access allows the visitor to experience content available to the host, such as the television broadcasts and on-demand programming, with the expectation that the visitor may consider becoming a customer. In other words, one incentive to provide access to content to a visitor may be the possibility that the visitor may find the content or programming provided though sufficiently attractive and enjoyable to switch service and/or content providers in their service area.

A service and/or content provider that allow access to content by a visitor may also charge the host for the access provided. Such a charge may be on a visitor-by-visitor basis or may be a fee assessed to the host to enable visitor access at any time. The broadband gateway may be utilized to manage the access being provided to a visitor or guest in accordance with the agreed-upon service between the service and/or content provider and the host. Since the broadband gateway may receive content through a plurality of network access service providers, the broadband gateway may be utilized to manage visitor access to content received through different network access service providers. In some instances, the broadband gateway may manage visitor access to more than one service and/or content provider concurrently.

By enabling a visitor or guest to have access or sample content without being subscribers, the host may be offered a reward as a way to encourage the host to provide such access. The service and/or content providers may want to encourage such access to have more visitor traffic, which may result in an increased number of potential new customers. The rewards or incentives provided may be received, processed, and/or managed by the broadband gateway. Examples of rewards may be a credit, a bonus, a coupon, or some other form of incentive to the host to continue to provide visitor access through the broadband gateway. The broadband gateway may process such incentives to enable the host or a user of the broadband gateway to redeem the rewards.

Thus, a broadband gateway may be utilized to allow a visitor to have convenient access to a portion of the content received by the host, to allow the host to receive and manage rewards or other incentives for enabling such access, and/or to allow more visitors to experience and sample the content available at the broadband gateway to increase the number of potential new customers for those providing services and/or content through the network access service providers.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of network access service providers 120, and a plurality of content providers 130. The home network 100a may be serviced by a broadband gateway 102. Also shown in FIG. 1 are additional home networks 100b, . . . , 100n, and an emergency services provider network 140. Each of the home networks 100b, . . . , 100n may also be serviced by a broadband gateway 102.

The content providers 130 may generate, capture, and/or package content, such as multimedia content, for example, that may be distributed to end users. Content originating from the content providers 130 may be distributed to end users (e.g., consumers) by the network access service providers 120. The term "network access service provider" as utilized herein, may be distinguished from the more generic term "service provider" that may refer to services other than providing physical layer access to a network. An entity that functions as a network access service provider, however, may also provide content and/or services other than network access. In some instances, an entity that functions as a network access service provider may generate, capture, and/or package content, such as multimedia content, for example, that may be distributed to end users. The content received through the network access service providers 120 may comprise programming scheduling information and/or metadata associated with such programming. In some instances, the metadata may originate in a server, such as a web server, associated with one or more of the content providers 130.

The network access service providers 120 may comprise various entities and/or networks that provide access to content and/or services using different access technologies, such as multimedia, television, Internet, phone, Ethernet, multimedia over coax alliance (MoCA), passive optical network (PON), and/or cellular services, for example, to a plurality of end users. The end users may utilize devices that may be configured to support the necessary networking and/or communication infrastructures and/or standards. For example, end users may utilize cellular devices or smartphones, personal computers (PCs), servers, and/or set-top boxes. Exemplary network access service providers may comprise, for example, cellular service providers (e.g., AT&T, Verizon), cable television (CATV) providers (e.g., Comcast, RCN, Cox), satellite television providers (e.g., DirectTV, DISH Network), Internet service providers (ISPs), digital subscriber line (DSL) providers, WiMAX providers, and/or plain old telephone service (POTS) providers. In an exemplary embodiment of the invention, the broadband gateway 102 may enable connecting to a plurality of network access service providers 120 to facilitate receiving content originating from one or more of the content providers 130. When more than one network access service provider 120 provides access to content and/or services to the broadband gateway 102, each network access service provider 120 may do so through a separate physical layer access. In an embodiment of the invention, a separate physical layer access may be enabled in the broadband gateway 102 by having a separate network interface for each network access service provider 120 within the broadband gateway 102, as described below with respect to FIG. 2B.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing content generated by the content providers 130 and/or by the network access service providers 120 to end users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the network access service providers 120, the distribution networks 110, and/or the content providers 130.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may support configuring and/or using a plurality of broadband connections 108 to the distribution networks 110. The broadband connections 108 may comprise wired and/or wireless connections between the broadband gateway 102 and the distribution networks 110, which may enable communication between the broadband gateway 102 and the network access service providers 120. The broadband gateway 102 may operate as an interface device that may allow one or more network access service providers, service providers, and/or content providers to interact with various devices in the home network. In this regard, the broadband gateway 102 may enable communication with each of the network access service providers 120 through separate interfaces. That is, each network access service provider 120 from the plurality of network access service providers 120 may interface with the broadband gateway 102 through a network interface that is separate and/or different from a network interface associated with each of the other network access service providers 120.

A single broadband gateway 102 may be operable to handle multiple physical layer access connections, where a physical layer may refer to an OSI layer 1. The connections may provide access to one or more of the distribution networks 110. The distribution networks 110 may be owned, operated, leased, or otherwise associated with different network access service providers 120. For example, one network access service provider 120 may provide network access to the broadband gateway 102 through a cable television connection over coaxial cabling associated with the CATV network 110b. In another example, a different network access service provider 120 may provide network access to the broadband gateway 102 through a DSL connection over twisted-pair cabling associated with the Internet 110a. In some instances, the broadband gateway 102 may be operable to concurrently communicate over several physical layer connections associated with the multiple network access service providers 120.

The broadband gateway 102 may be operable to perform and/or provide various services that may pertain to enabling and/or facilitating reception of multimedia content. The content may be delivered through one or more network access services providers 120 and their associated networks, which may include at least some portions of the distribution networks 110. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100a, using wired and/or wireless communication links.

Devices serviced by, and/or connected to the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a detector 104c (e.g., a smoke detector, a carbon monoxide detector, a security alarm), a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, which may be communicatively coupled to only the broadband gateway 102, are shown, the invention may not be so limited. Accordingly, the devices 104a-104j, which may be communicatively coupled to multiple broadband gateways in a local or home network, may be implemented without departing from the spirit and scope of various embodiments of the invention.

As illustrated in FIG. 1, a plurality of home networks 100b, . . . , 100n, may also be connected to the distribution networks 110. These home networks 100b, . . . , 100n may operate in substantially the same manner as the home network 100a. By having more than one home network connected to the distribution networks 110, various applications, such as peer-to-peer communication and/or data aggregation operations may be possible by utilizing the broadband gateways 102 in the home networks.

The broadband gateway 102 may also provide emergency-related services in the home network 100a. For example, the emergency services provider network 140 may be connected to the distribution networks 110 via a link 112. The emergency services provider network 140 may be associated with one or more emergency service provider entities. For example, a public entity such as a 911 center and/or a private entity such as a security company may be able to interact with the broadband gateway 102 in the home network 100a via the distribution networks 110.

In operation, the broadband gateway 102 may be utilized as an interface device that may allow one or more of the network access service providers 120 and/or the content providers 130 to interact with various devices in a home network, such as the home network 100a. In some instances, the various devices in the home network may comprise one or more visitor devices, which may be communicatively coupled to the home network 100a when brought to the place where the broadband gateway 102 is located by a visitor or guest. The broadband gateway 102 may be operable to perform and/or provide various services that may pertain to enabling and/or facilitating reception of content, such as multimedia content, for example. The broadband gateway 102 may distribute the received content to one or more devices in the home network 100a for consumption. The broadband gateway 102 may perform, directly and/or indirectly using other devices, any processing and/or operations that may be needed to ensure that the content may be consumed by a targeted home device.

Figure 2A:
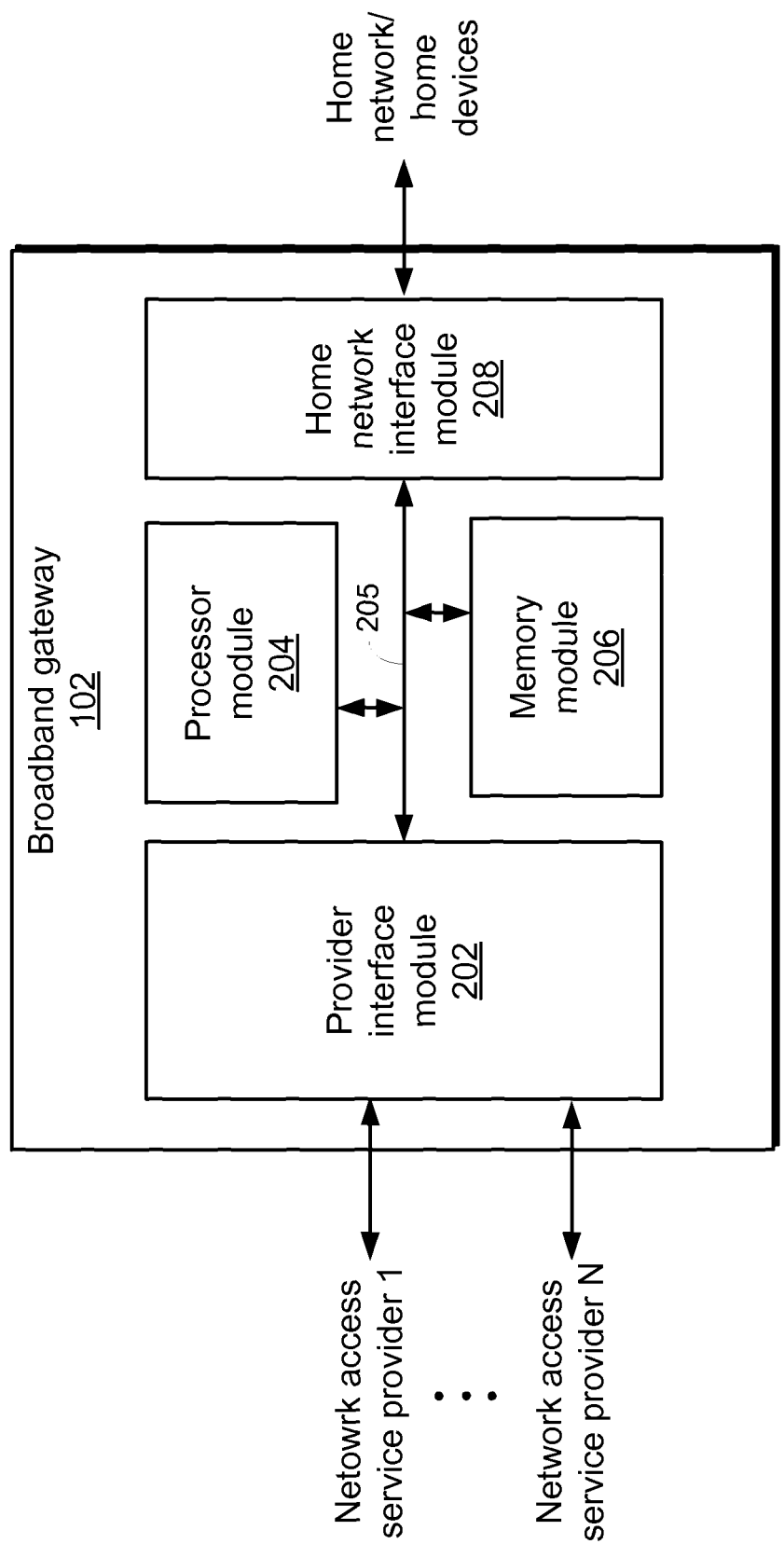
FIGS. 2A and 2B are block diagrams illustrating exemplary broadband gateways, in accordance with embodiments of the invention.

FIG. 2A is a block diagram illustrating an exemplary broadband gateway, in accordance with an embodiment of the invention. Referring to FIG. 2A, there is shown a more detailed view of an exemplary architecture of the broadband gateway 102 described above with respect to FIG. 1. The broadband gateway 102 may comprise suitable logic, circuitry, code, and/or interfaces that may be operable to provide connectivity between one or more networks, such as the distribution networks 110, for example, and one or more devices in a home network, such as the home devices 104a-104j in the home network 100a. Access from the broadband gateway 102 to the distribution networks 110 may be provided through one or more of the network access service providers 120. Moreover, the broadband gateway 102 may be operable to provide connectivity between one or more networks and one or more visitor devices (not shown) that may be communicatively coupled to a home network. In this regard, the broadband gateway 102 may enable a visitor device outside their service and/or content provider service area to obtain limited access to content from the broadband gateway 102 by, for example, classifying the visitor device, assigning a level of access to the visitor device, and/or authorizing the access by the visitor device.

The broadband gateway 102 may comprise suitable hardware and/or software to provide some or all of the functions and/or operations of one or more of a modem, a router, and a switch. The modem functions and/or operations may be those of a DSL modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. The modules in the broadband gateway 102 may communicate with one or more of the other modules through one or more buses and/or connections 205. In some instances, the broadband gateway 102 may be such that the various modules listed above may be distributed over multiple devices. In such instances, the buses and/or connections 205 may enable communication between the various modules across the multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data and/or to send data through one or more of the network access service providers 120, for example. The data received and/or sent may be associated with content from the content providers 130 and/or from the network access service providers 120. The provider interface module 202 may be operable to support multiple communication protocols, standards, and/or data transport technologies. As illustrated in FIG. 2A, the provider interface module 202 may be operable to interface with one or more of the network access service providers 120. In an embodiment of the invention, the provider interface module 202 may be operable to interface with N of the network access service providers 120. The provider interface module 202 may be communicatively coupled to the various network access service providers 120 via a plurality of broadband connections 108 described above with respect to FIG. 1.

The processor module 204 may comprise suitable logic, circuitry, code, and/or interfaces that may be operable to process data received and/or sent through one or more of the network access service providers 120, and/or data received from and/or sent to one or more devices in the home network 100a. In this regard, the processor module 204 may comprise one or more portions that are suitable to handle certain types of data such as video data and/or audio data, for example. For example, the processor module 204 may comprise a core processor (not shown), a video processor (not shown), and an audio processor (not shown). The processor module 204 may be operable to perform operations associated with managing visitor device access to portions of the content received by the broadband gateway 102. These operations may comprise device classification operations, device authorization operations, including time-related operations, protocol management, and/or reward or incentive management.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device. The memory module 206 may be operable to store data associated with managing visitor device access to portions of the content received by the broadband gateway 102. For example, the data stored in the memory module 206 may comprise data associated with device classification operations, device authorization operations, protocol management operations, and/or reward or incentive management operations. The device authorization operations may comprise time-related operations such as enabling and disabling authorized access in accordance with certain temporal conditions.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies. Moreover, the client network interface module 208 may be operable to receive data from and/or send data to one or more visitor devices communicatively coupled to the home network.

The broadband gateway 102 may be operable to provide access to more than one visitor device communicatively coupled to the broadband gateway 102. In such instances, the number of visitor devices that may be allowed access to content from the broadband gateway 102 may be limited to a fixed or determined number of devices. Moreover, for a particular type of content, the broadband gateway 102 may also limit the number of visitor devices that may be provided access to that content.

In operation, the broadband gateway 102 may enable one or more guests or visitors to access content available to the broadband gateway 102. The content may be received by the broadband gateway 102 through one or more of the N network access service providers 120 that communicate with the broadband gateway 102. In some instances, content may be concurrently received by the broadband gateway 102 through more than one of the N network access service providers 120. After a visitor's device, such as a wireless device, for example, is communicatively coupled to the broadband gateway 102, the visitor device may be classified by the processor module 204. Based on the classification, the device may be authorized to access a portion of the content received by the broadband gateway 102. The authorization procedures may be performed and/or managed by the processor module 204. Once the authorization process is complete, the appropriate content may be made available and may be communicated to the visitor device through the home network interface module 208. The authorization procedures may include the authentication of a device identifier and/or a user identifier received by the broadband gateway 102 from the visitor device. In some instances, the authentication may be performed by the broadband gateway 102. In other instances, an entity associated with providing the content received by the broadband gateway 102 may also be utilized in connection with the authentication of the device identifier and/or a user identifier received by the broadband gateway 102 from the visitor device. The authorized access to the content may be time-limited, but may be renewed, enabled, or extended when a request is received by the broadband gateway within a determined period of time. In various embodiments of the invention, the broadband gateway 102 may be operable to control leasing of access and access rights to visitor devices. Disabling and enabling of the authorized access may be managed by the processor module 204, for example.

Figure 2B:
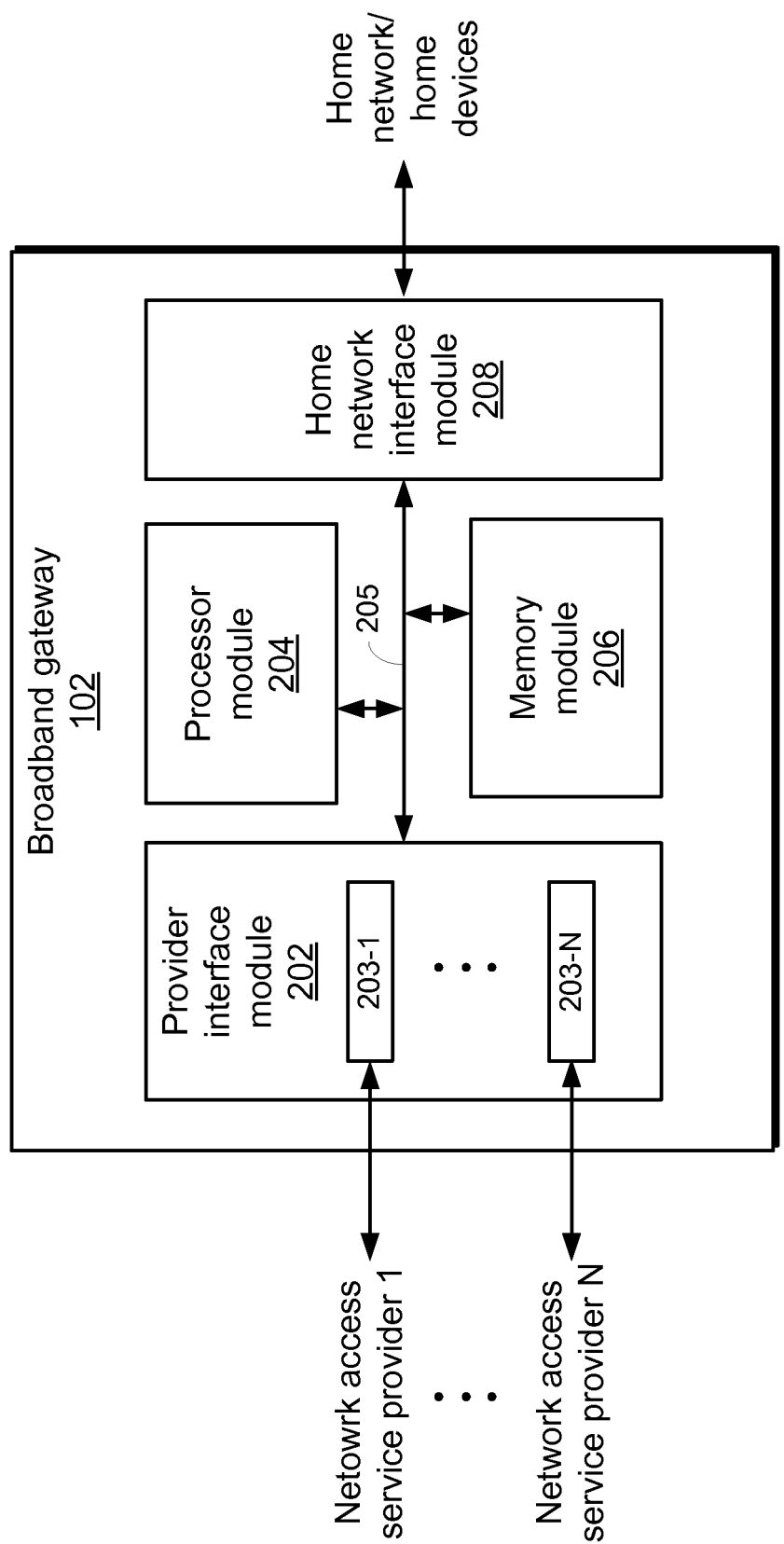

FIG. 2B is a block diagram illustrating an exemplary broadband gateway, in accordance with another embodiment of the invention. Referring to FIG. 2B, there is shown the broadband gateway 102 with the provider interface module 202 comprising N separate network interfaces 203-1, ..., 203-N, each of which is associated with one of the N network access service providers 120. In this manner, the broadband gateway 102 may separately interface with the network access service providers 120. The network interfaces 203-1, ..., 203-N may enable the broadband gateway 102 to handle separate physical layer access for each of the N network access service providers 120. For example, the broadband gateway 102 may interface with each of a cellular service provider, a CATV provider, a satellite television provider, an ISP, and/or POTS provider through a separate network interface, each of which comprises suitable logic, circuitry, code, and/or interfaces to enable physical layer access.

Figure 3:
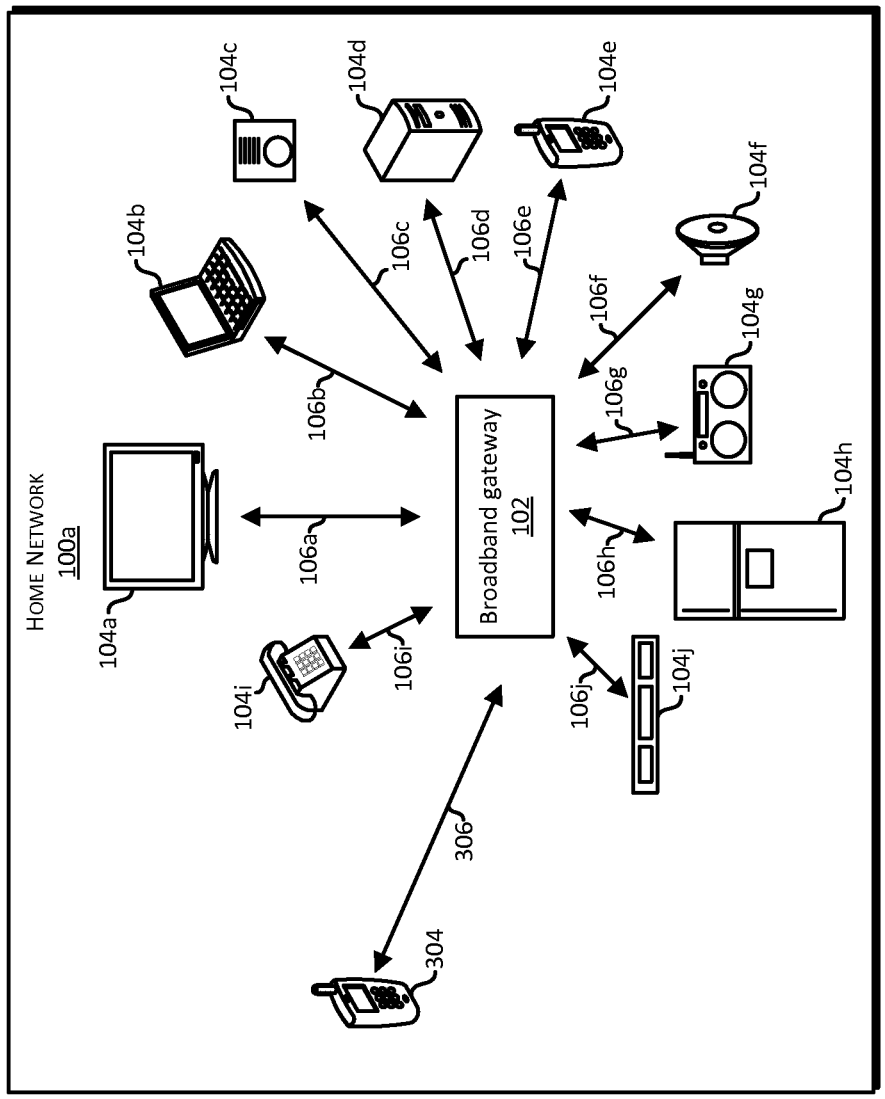
FIG. 3 is a block diagram that illustrates a visitor device connected to a broadband gateway through a home network, in accordance with an embodiment of the invention.

FIG. 3 is a block diagram illustrating a visitor device connected to a broadband gateway through a home network, in accordance with an embodiment of the invention. Referring to FIG. 3, there is shown the home network 100a as described above with respect to FIG. 1. Also shown is a visitor device 304 communicatively coupled to the broadband gateway via a link 306 that may be substantially similar to the links 106a-106j described above. Examples of the visitor device 304 may include a laptop computer, a smartphone, a tablet computer, a personal digital assistant (PDA), or the like device.

The visitor device 304 may be a device associated with a visitor or guest that may be visiting or staying at the place where the broadband gateway 102 is located. As described above, the location of the broadband gateway 102 may be a residence, a small business, a school, a library, and/or other like settings in which a user, in this case a visitor, may want to obtain access to at least a portion of the content available to the broadband gateway 102. Just like the visitor device may be associated with the visitor or guest, the broadband gateway 102 may be associated with the place or person hosting that visitor or guest.

The link 306 between the visitor device 304 and the broadband gateway 102 may support wired and/or wireless connections, one or more standards and/or protocols, and/or one or more communication technologies. Once the link 306 is established between the visitor device 304 and the broadband gateway 102, the broadband gateway 102 may classify the visitor device 304.

The classification of the visitor device 304 by the broadband gateway 102 may comprise assigning a level of access from a plurality of levels of access that may be available to the visitor device 304. The classification may be based on, for example, a visitor or guest profile, which may be stored in the memory module 206 of the broadband gateway 102. The level of access assigned to the visitor device 304 may indicate, among other things, a type of content for which access is to be provided, a service and/or content provider associated with the content, an authorization procedure for granting access to the content, a number of visitor devices that may concurrently access the content, a time limit for the authorized access to the content, whether the authorized access to the content may be enabled once expired, and/or the conditions that may be needed to enable the authorized access after expiration.

The visitor or guest profile may comprise a list of users that may be pre-assigned a particular level of access to content received by the broadband gateway 102. The visitor or guest profile may be populated by the host through a web-based application and/or a television menu, for example. In this regard, the host may add, delete, and/or edit information in the visitor or guest profile through a graphical user interface displayed on the television 104a, for example. At least a portion of the options that may be part of the visitor or guest profile may depend on the type of visitor access allowed by service and/or content providers associated with content that is available at the broadband gateway 102.

When a visitor requests access to content from the broadband gateway 102, he or she may do so through a web-based application and/or a graphical user interface available on his or her own visitor device 304, for example. The visitor device 304 may provide indentifying information that the broadband gateway 102 may compare or authenticate with the information in the visitor or guest profile to determine the level of access associated with the visitor device 304. When a visitor is not included in the visitor or guest profile, the broadband gateway 102 may still assign a level of access to that visitor's visitor device 304, but the level of access assigned may be limited. For example, any visitor device 304 that is able to establish a communication link with the broadband gateway 102 may be deemed sufficiently acceptable to be assigned a basic level of access to content in the broadband gateway 102. A basic or limited level of access may be assigned even when the visitor is not listed in the visitor or guest profile since for the visitor device 304 to establish a link with the broadband gateway 102, either through a wireless connection or a physical connection, the visitor device 304 is likely to be very close to the broadband gateway 102, typically within the place where the broadband gateway 102 is located. For example, a visiting friend not yet included in the visitor or guest profile is likely to be able to have his or her device establish a wireless link with the broadband gateway 102 through the home network 100a. The device may then be assigned a limited or basic level of access, which may later be updated when the host adds the friend to the visitor or guest profile.

Figure 4:
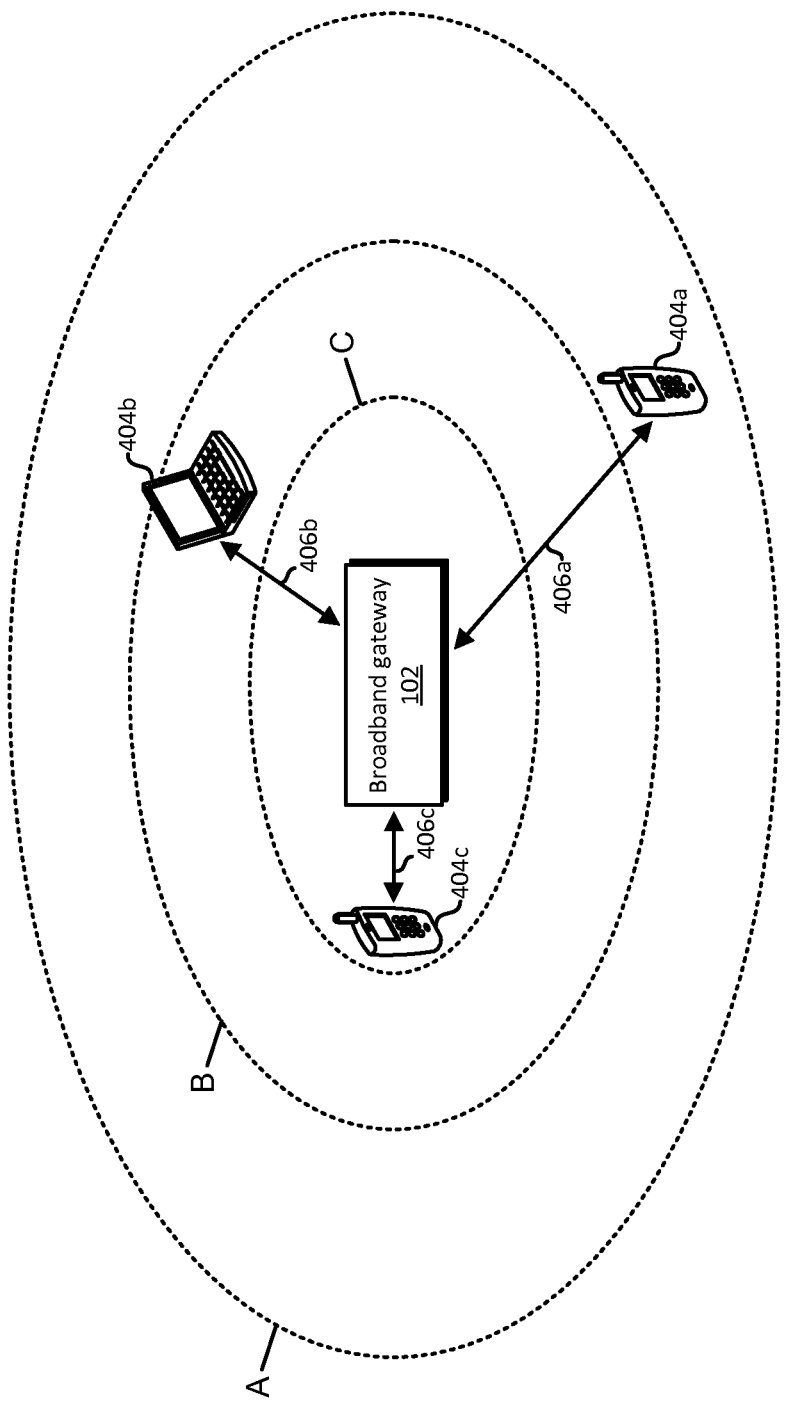
FIG. 4 is a diagram that illustrates classification of a visitor device based on the position of the device with respect to a broadband gateway, in accordance with an embodiment of the invention.

FIG. 4 is a diagram that illustrates classification of a visitor device based on the position of the device with respect to a broadband gateway, in accordance with an embodiment of the invention. Referring to FIG. 4, there is shown the broadband gateway 102 described above and the visitor devices 404a, 404b, and 404c, each of which is a wireless device. In this illustrative example, the level of access assigned to each of these visitor devices may be based on the distance or position of the visitor device relative to the broadband gateway 102. For example, the visitor device 404a may be located in a region A that is, as shown, the outermost region from the place where the broadband gateway 102 is located. The visitor device 404a may communicate with the broadband gateway 102 through an established link 406a. One such instance may occur when, for example, the visitor device 404a is associated with a next door neighbor who is nearby but not inside a host's home where the broadband gateway 102 is located. The visitor device 404b may be located in a region B that is, as shown, the next closest region to the place where the broadband gateway 102 is located. The visitor device 404b may communicate with the broadband gateway 102 through an established link 406b. An example of such an instance may occur when a visitor is in a common area in the host's home but is not granted sufficient access within the home to be adjacent to the broadband gateway 102. The visitor device 404c may be located in a region C that is shown to be the closest region to the place where the broadband gateway 102 is located. The visitor device 404c may communicate with the broadband gateway 102 through an established link 406c. One such instance may occur when, for example, a visitor has sufficient freedom within a host's home that that the visitor may be right next to the host's broadband gateway 102.

For each of the visitor devices 404a, 404b, and 404c, the level of access assigned by the broadband gateway 102 may be different based, at least partially, on the position of the visitor device. For the visitor device 404a, for example, the broadband gateway 102 may provide a basic or limited level of access given that the visitor device 404a is not likely to be inside the host's home. For example, the authorization procedure associated with the visitor device 404a may be somewhat demanding, the content that is accessible may be limited, the access authorization duration may be short, and/or the access authorization may not be renewable once terminated or disabled. For the visitor device 404b, for example, the broadband gateway 102 may provide a higher level of access. For example, the authorization procedure associated with the visitor device 404b may be less demanding than for the visitor device 404a, the content that is accessible may be more extensive than that for the visitor device 404a, the access authorization duration may be longer than that of the visitor device 404a, and/or the access authorization may be renewable once terminated or disabled. For the visitor device 404c, for example, the broadband gateway 102 may provide the highest level of access. For example, the visitor device 404c may be pre-authorized to access content, the content that is accessible may be fairly broad and extensive, and/or the access authorization may not be time limited.

To enable assigning a level of access based on the position or location of the visitor device, the broadband gateway 102 may receive position or location information from the visitor device and/or may determine a distance based on data communicated between the visitor device and the broadband gateway 102. For example, the visitor devices 404a, 404b, and 404c may provide global positioning system (GPS) data to indicate their current position. In this regard, the broadband gateway 102 may receive and/or may have stored information regarding its own GPS data such that a distance calculation may be performed. In another example, the broadband gateway 102 may utilize certain information about the communication signals, such as signal strength information and/or link quality information, for example, to determine a distance between the broadband gateway 102 and a visitor device.

In another embodiment of the invention, the level of access, when based on the position of the visitor device, may vary dynamically as the visitor device moves closer to or further from the broadband gateway 102. For example, a visitor device having a basic level of access may be upgraded to a higher access level after moving closer to the broadband gateway 102 for a certain amount of time. In another example, a visitor device having a high level of access may be downgraded to a lower level of access after moving away from the broadband gateway 102 for a certain amount of time.

Although the visitor devices 404a, 404b, and 404c have been shown as wireless devices, the invention need not be so limited. The level of access of a particular visitor device may dynamically change based on the location of that visitor device, regardless of whether the visitor device is a wireless device or otherwise, as long as the visitor device remains capable of establishing communication link with the broadband gateway 102. For example, a visitor device that establishes a link with the broadband gateway 102 through a wired connection in a common area of a host's home may be granted a lower level of access than a visitor device that establishes a link with the broadband gateway 102 through a wired connection in a guest bedroom in the host's home.

Figure 5:
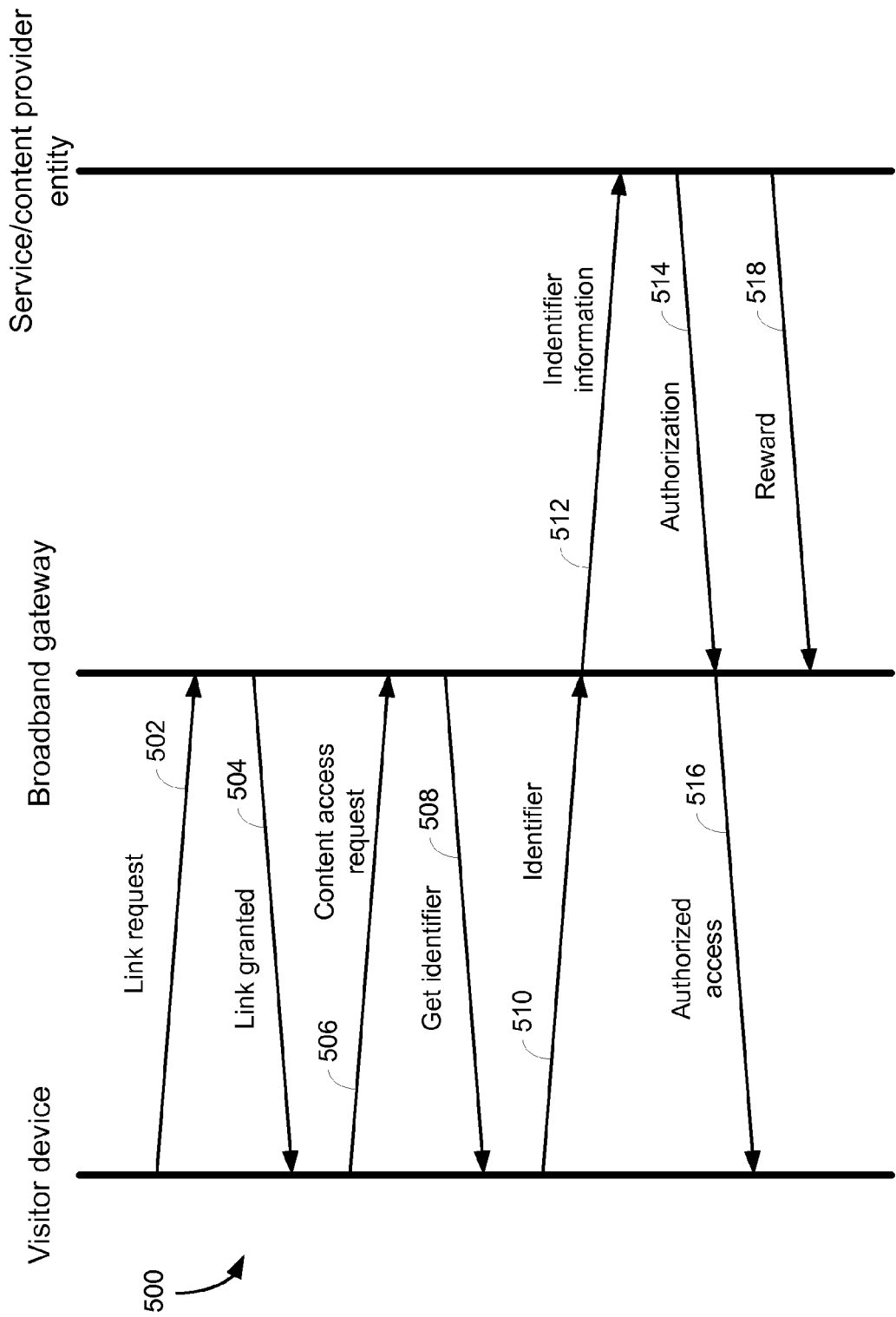
FIG. 5 is a diagram that illustrates an exemplary protocol for providing content access to a visitor device through a broadband gateway, in accordance with an embodiment of the invention.

FIG. 5 is a diagram that illustrates an exemplary protocol for providing content access to a visitor device through a broadband gateway, in accordance with an embodiment of the invention. Referring to FIG. 5, there is shown a protocol 500 that may be utilized in connection with the broadband gateway 102 to provide access to content to a visitor device, such as the visitor device 304 in FIG. 3, for example. At step 502, a visitor may bring the visitor device 304 to a location that is within the area of coverage of the home network 100a associated with the broadband gateway 102. In an embodiment of the invention, the visitor device 304 may connect to the home network 100a, and therefore to the broadband gateway 102, through a wired connection, such as when the home network 100a comprises a LAN, for example. In another embodiment of the invention, the visitor device 304 may connect to the home network 100a, and therefore to the broadband gateway 102, through a wireless connection, such as when the home network 100a comprises a wireless LAN (WLAN) or WiFi network, for example.

To access the broadband gateway 102 through the home network 100a, whether it is done using a wired connection or a wireless connection, the visitor device 304 may communicate a link request to the broadband gateway 102. The link request may indicate to the broadband gateway 102 that the visitor device 306 may wish to establish a communication link, such as the link 306 described above with respect to FIG. 3. Such a request may be, for example, a typical request supported by the communication standards and/or protocols associated with the connection between the broadband gateway 102 and the visitor device 304 through the home network 100a.

At step 504, the broadband gateway 102 may communicate an indication to the visitor device 304 that a link to the broadband gateway 102 has been granted, and consequently, the communication link 306 may be established between the visitor device 304 and the broadband gateway 102. The steps 502 and 504 described above are provided by way of illustration and not of limitation. More detailed steps may be utilized to establish the communication link 306 between the visitor device 304 and the broadband gateway 102. Such steps may comprise the transfer of an identifier from the visitor device 304 to the broadband gateway 102. The identifier may comprise one or both of device identification information and user identification information. When such identifying information is transferred to the broadband gateway 102 as part of steps 502 and 504, the same information need not be transferred in connection with subsequent steps of the protocol 500. The remaining steps of the protocol 500 described below may assume that such a transfer of identifying information may not have occurred in connection with steps 502 and 504.

At step 506, once the communication link 306 has been established between the visitor device 304 and the broadband gateway 102, the visitor device 304 may communicate a content access request to the broadband gateway 102. For example, the visitor or guest associated with the visitor device 304 may open a web browser on the visitor device 304. By opening a web browser, or other type of graphical user interface, the visitor device 304 may initiate a request to the broadband gateway 102 for content that the visitor may desire to have displayed on the web browser.

At step 508, the broadband gateway 102, after receiving the content access request from the visitor device 304 in step 506, may communicate an identifier request to the visitor device 304. The identifier request may result in the visitor being prompted for such information through the web browser, for example.

At step 510, the visitor device 304 may provide an identifier to the broadband gateway 102 as requested in step 508. The identifier may comprise one or both of device identification information and user identification information. The device identification information may comprise a device ID and/or device characteristics such as device type, device networking capabilities, device processing capabilities, device display capabilities, and/or device audio reproduction capabilities, for example. The user identification information may comprise a user ID and/or user information such as user electronic mail address and/or user personal address, for example.

Having information about the visitor device 304, the broadband gateway 102 may classify the visitor device 304 as described above with respect to FIGS. 3 and 4. For example, the broadband gateway 102 may assign a level of access to the visitor device 304 based on a visitor or guest profile, the characteristics of the visitor device 304, and/or the location of the visitor device 304 with respect to the broadband gateway 102. The level of access that is assigned to the visitor device 304 may indicate, among other things, a type of content for which access is to be provided, a service and/or content provider associated with the content, an authorization procedure for granting access to the content, a number of visitor devices that may concurrently access the content, a time limit for the authorized access to the content, whether the authorized access or lease may be enabled once expired, and/or conditions to enable the authorized access after expiration.

With respect to the visitor or guest profile, the broadband gateway 102 may determine whether the visitor device 304 is associated with an entry in the visitor or guest profile in the broadband gateway 102. When there is a match or authentication of the visitor device 304 with respect to the visitor or guest profile, a corresponding level of access indicated by the visitor or guest profile may be assigned to the visitor device 304. When a match does not occur, the visitor device 304 may be denied access or may be assigned a basic level of access in view of the ability of the visitor device 304 to establish the communication link 306 with the broadband gateway 102. In addition, the characteristics of the visitor device 304, such as display and/or coding/decoding (CODEC) capabilities, for example, may also be considered when assigning the level of access since the type of content that may be consumed by the visitor device 304 may depend on its capabilities. For example, a smartphone may be provided with a different level of access to content than that of a laptop computer based on the difference in display and/or data processing capabilities. Moreover, when the visitor device 304 is a wireless device, the level of access assigned may be based on a distance between the visitor device 304 and the broadband gateway 102. The level of access assigned may change when, for example, the location of the visitor device 304 changes.

At step 512, once the visitor device 304 is classified, the broadband gateway 102 may determine the authorization procedure for granting access to the content. The broadband gateway 102 may communicate some or all of the identifying information provided by the visitor device 304 to an entity associated with providing the content for which authorized access is being requested. Such entity may be associated with a service provider and/or a content provider. In some instances, the broadband gateway 102 may authenticate at least a portion of the identifying information before communicating the identifying information to the entity. The entity may receive the information and may verify or authenticate the information. Even when a particular visitor device is pre-authorized to access content based on its classification, the entity may still require that some identifying information be provided to proceed with the authorization. For example, the entity may require an email address or a physical address where it may send advertisement or offers that may entice the visitor associated with the visitor device 304 to switch or change service and/or content provider.

At step 514, the entity may communicate an indication that the visitor device 314 is authorized to access a portion of the content provided to the broadband gateway 102. At step 516, the broadband gateway 102 may provide the content for which access has been authorized to the visitor device 304. At step 518, the same entity as in steps 512 and 514, or another related entity, may communicate to the broadband gateway 102 an indication of a reward associated with enabling the visitor device 304 to access content. As described above, such incentives may be provided to encourage new potential customers to sample the content available from a different service and/or content provider.

The protocol 500 described above has been presented by way of illustration and not of limitation. Other embodiments of the invention may be possible in which variations of the protocol 500 may be utilized to provide access to a visitor device to content available in a broadband gateway.

Figure 6:
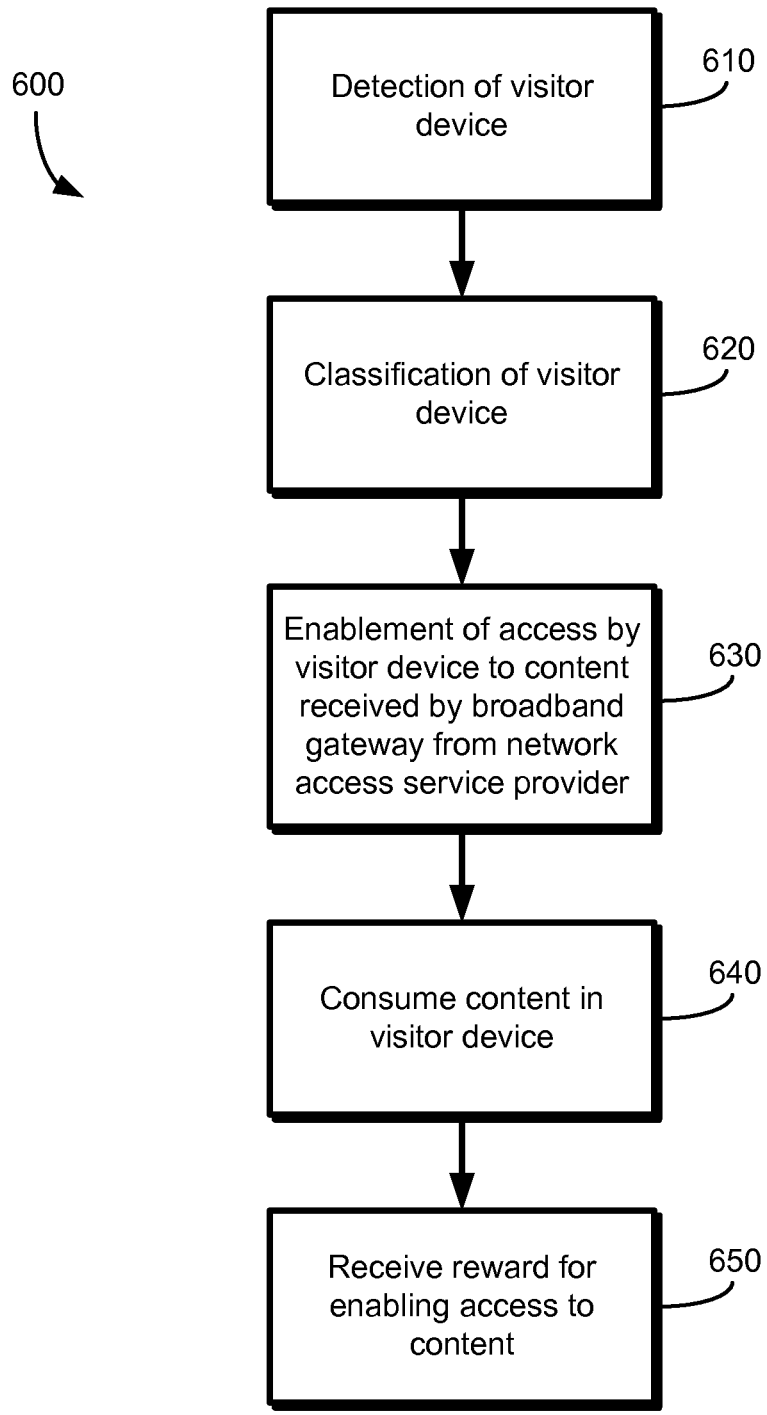
FIG. 6 is a flow chart that illustrates exemplary steps for providing content access to a visitor device through a broadband gateway, in accordance with an embodiment of the invention.

FIG. 6 is a flow chart that illustrates exemplary steps for providing content access to a visitor device through a broadband gateway, in accordance with an embodiment of the invention. Referring to FIG. 6, there is shown a flow chart 600 in which, at step 610, a visitor device, such as the visitor device 304, may be detected by a broadband gateway 102. The visitor device 304 may be detected in connection with establishing the communication link 306 with the broadband gateway 102 through the home network 100a, as shown in FIG. 3. In this regard, the presence of the visitor device 304 on the home network 100a may be determined by one or both of the provider interface module 202 and the processor module 204 in the broadband gateway 102.

At step 620, the broadband gateway 102 may classify the visitor device 304. The classification may be performed by, for example, the processor module 204 in the broadband gateway 102. The classification may be based on information stored in the memory module 206 in the broadband gateway 102. For example, the classification may be based on a visitor or guest profile, characteristics of the visitor device 304, and/or the distance between the visitor device 304 and the broadband gateway 102, some or all of which may be stored in the memory module 206.

At step 630, based on the classification, the broadband gateway 102 may perform the appropriate procedures to enable access by the visitor device 304 to the content received by the broadband gateway 102 through one or more of the network access service providers 120. Such procedures may be performed and/or managed by the processor module 204. Moreover, the procedures performed may comprise appropriate authorization procedures that are based on the level of access assigned to the visitor device 304.

At step 640, once access to the content is authorized, the broadband gateway 102 may transfer or communicate the authorized content to the visitor device 304. At that point, the visitor associated with the visitor device 304 may consume the content. For example, video, web, text, and/or graphical content may be displayed and/or audio content may be reproduced for consumption by the visitor utilizing the visitor device 304.

At step 650, an indication of a reward associated with enabling the visitor device 304 to access content may be communicated to the broadband gateway 102. Such an incentive may be provided to encourage new potential customers to sample the content available from a different service and/or content provider.

Figure 7:
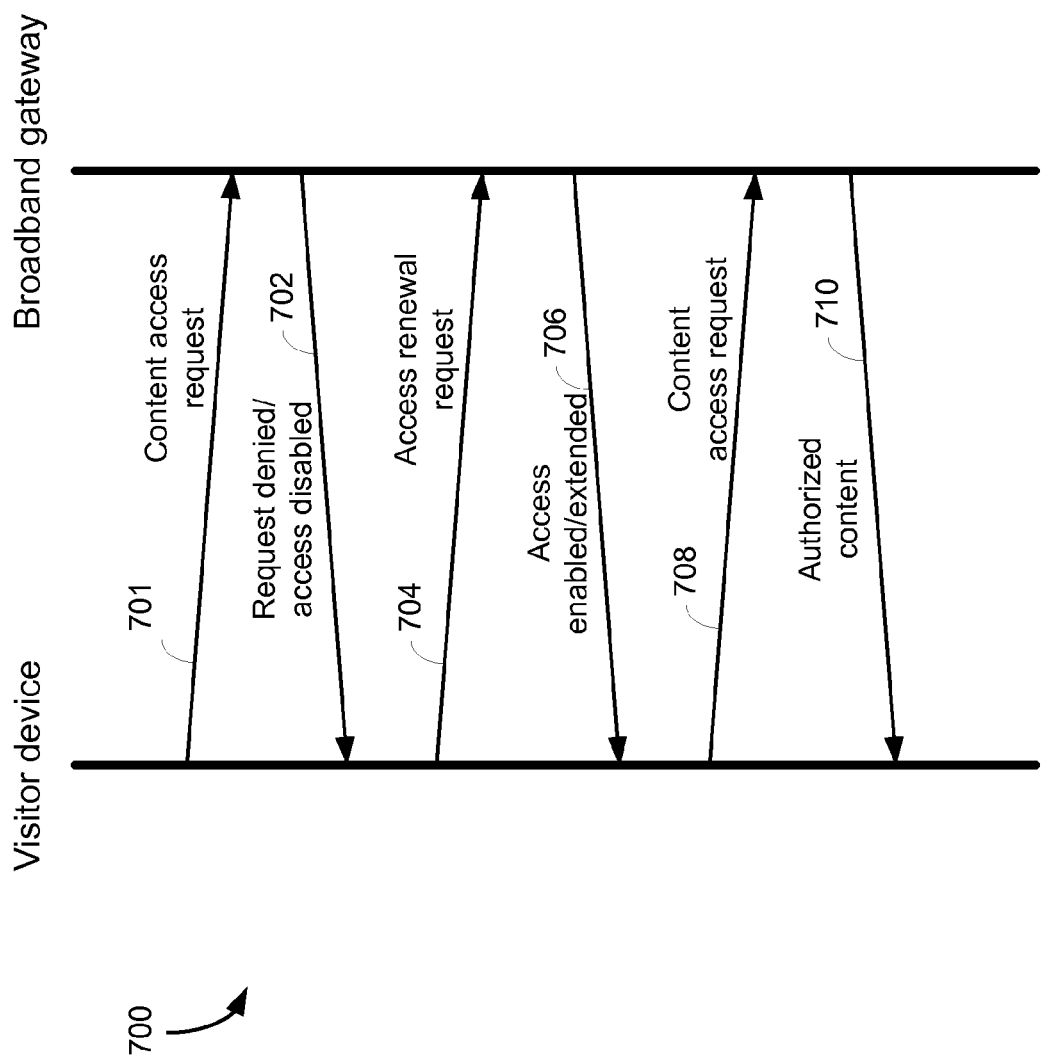
FIG. 7 is a diagram that illustrates an exemplary protocol for time-based authorized access and access renewal, in accordance with an embodiment of the invention.

FIG. 7 is a diagram that illustrates an exemplary protocol for time-based authorized access and access renewal, in accordance with an embodiment of the invention. Referring to FIG. 7, there is shown a protocol 700 that may be utilized in connection with the broadband gateway 102 to provide time-based authorized access and access renewal for the visitor device 304, for example. At step 701, the visitor device 304 may communicate a content access request to the broadband gateway 102. At step 702, the broadband gateway 102 may deny the request and disable the access previously authorized to the visitor device 304. The access may be disabled after a certain amount of time has passed since the access was first authorized or upon expiration of a lease. The amount of time that may pass before disabling the authorized access may be based on the level of access assigned to the visitor device 304. For example, for a high level of access, the authorized access may not be disabled, and when disabling is allowed, the access may be disabled after a long period of time. For a low or basic level of access, the authorized access may be disabled after just a short period of time.

A time-limited access authorization is consistent with the fact that most visitors are not expected to stay for indefinite periods of time. The amount of time the broadband gateway 102 is to wait before disabling an authorized access by the visitor device 304 may be stored in the visitor or guest profile, for example. The host may adjust or modify the time a particular level of access or a particular visitor is allowed to have access to content before the access is disabled. Prior to having the access disabled, the broadband gateway 102 may prompt the visitor with an indication of a remaining time before the access is disabled.

At step 704, once the authorized access is disabled, the visitor device 304 may communicate a request for access renewal to the broadband gateway 102. The visitor device 304 may have to make the request within a certain amount of time from the time the authorized access was disabled. For example, when the visitor device 304 has been assigned a high level of access, the visitor device 304 may have a long period of time after the time the access was disabled to send a request for the authorized access to be renewed or enabled. When the visitor device 304 has been assigned a low level of access, the visitor device 304 may have a short period of time after the time the access was disabled to send a request for the authorized access to be renewed or enabled. When the visitor device 304 does not send the request within the appropriate amount of time, the visitor device 304 may need to proceed with the authorization procedure as described above with respect to FIG. 5. When the visitor device 304 sends the request after being prompted by the broadband gateway 102 but before the access is disabled, the broadband gateway 102 may allow the currently authorized access to be extended for a determined period of time.

At step 706, when the request is sent within the appropriate period of time after the authorized access is disabled or before the authorized access is disabled, the broadband gateway 102 may communicate an indication to the visitor device 304 that the authorized access is being enabled or extended, respectively.

At step 708, after the authorized access is enabled, the visitor device 304 may communicate a content access request to the broadband gateway 102. At step 710, the broadband gateway 102 may provide the content to the visitor device 304. In some instances, steps 708 and 710 may be optional and the visitor device 304 may be provided access without the need to communicate a content access request.

The protocol 700 described above has been presented by way of illustration only and not by way of limitation. Other embodiments of the invention may be possible in which variations of the protocol 700 may be utilized to provide time-based authorized access and access renewal for a visitor device.

Figure 8:
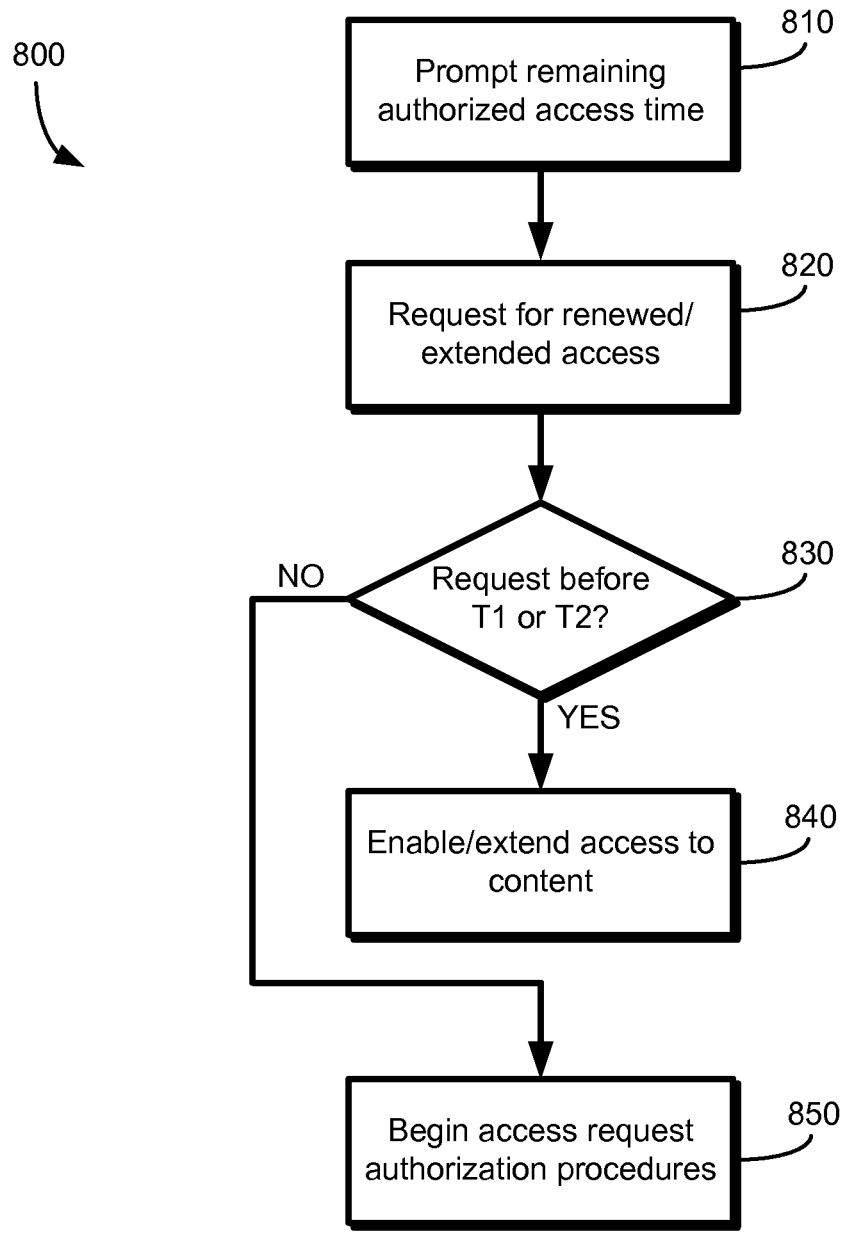
FIG. 8 is a flow chart that illustrates steps for time-based authorized access and access renewal, in accordance with an embodiment of the invention.

FIG. 8 is a flow chart that illustrates steps for time-based authorized access and access renewal, in accordance with an embodiment of the invention. Referring to FIG. 8, there is shown a flow chart 800 in which, at step 810, the broadband gateway 102 may generate an indication of an amount of time that remains for the authorized access of content by the visitor device 304. The indication may be generated by the processor module 204 in the broadband gateway 102. The broadband gateway 102 may communicate the indication to the visitor device 304 through the home network interface module 208. Once the indication is received by the visitor device 304, the visitor may be presented with a visual display and/or audible signal to convey the remaining amount of time of authorized access.

At step 820, the visitor may provide an input to the visitor device 304, which in response to the input, may generate a request for renewal of the authorized access. The request may be communicated to the broadband gateway 102 through the home network interface module 208 and processed by the processor module 204.

At step 830, when the request is sent, received, and/or processed before a first determined time (T1) occurs, the process may proceed to step 850. The first determined time may be a specified time at which to disable the authorized access. In other words, when provided with a time at which the authorized access is to end, the visitor may decide to request an extension before the end of the authorized access occurs. The first determined time may be specified in accordance with the level of access of the visitor device 304. For a higher level of access, the first determined time may occur long after the access was authorized. For a basic level of access, the first determined time may occur shortly after the access was authorized. At step 840, the broadband gateway 102 may simply extend the currently authorized access.

Returning to step 830, when the request is sent, received, and/or processed on or before a second determined time (T2) occurs, the process may also proceed to step 840. The second determined time may be a specified time within which to enable the authorized access when such enabling is requested. The second determined time may be specified in accordance with the level of access of the visitor device 304. In other words, once the authorized access has been disabled, the visitor may be able to easily enable access without the need for a complete authorization operation if a request occurs during a set period of time after the disabling of the access.

For a higher level of access, the second determined time may occur long after the first determined time. In such a case, a visitor may have a long time to request that the authorized access be renewed after it has been disabled without the need to perform a complete authorization procedure. For a basic level of access, the second determined time may occur shortly after the first determined time. In such a case, a visitor may not have much time to request that the authorized access be renewed after it has been disabled. At step 840, the broadband gateway 102 may enable the authorized access.

Returning to step 830, when the request is sent, received, and/or processed after T2 occurs, the visitor device 304 may need to proceed to step 850 in which the authorization procedure as described above with respect to FIG. 5 it to be carried out. The managing of the various timing events described above with respect to FIG. 8 may be performed by the processor module 204 in the broadband gateway 102. Moreover, information related to the first determined time and the second determined time for various levels of access may be stored in the memory module 206.

Figure 9:
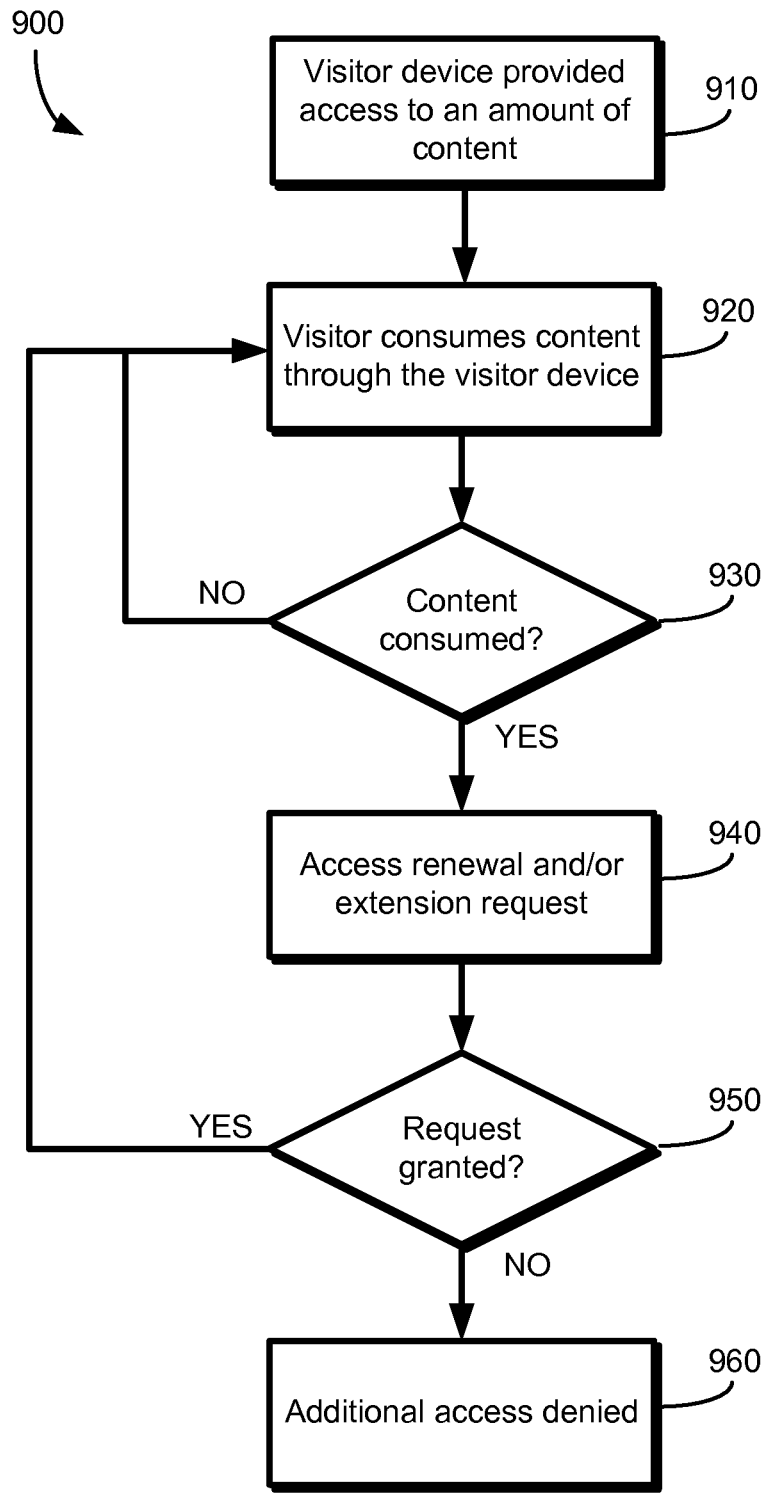
FIG. 9 is a flow chart that illustrates steps for amount-based authorized access and access renewal, in accordance with an embodiment of the invention.

FIG. 9 is a flow chart that illustrates steps for amount-based authorized access and access renewal, in accordance with an embodiment of the invention. Referring to FIG. 9, there is shown a flow chart 900 in which, at step 910, the broadband gateway 102 may provide access to the visitor device 304. The access in this instance is to a determined amount of content. The amount of content may be based on, for example, the level of access associated with the visitor device 304. For example, when the level of access is high, the visitor device 304 may be provided with access to a large amount of content. In this manner, a visitor utilizing the visitor device 304 may have access to a large number of movies and/or other programming during his or her stay, for example. In some instances, the amount of content may be in the order of several gigabytes (GBs) of content. In another example, when the level of access is low, the visitor device 304 may be provided with a small amount of content, which may be sufficient for what may typically be a short stay.

At step 920, the visitor may begin to consume or utilized the content available to him or her in connection with the access authorized by the broadband gateway 102. At step 930, when the entire amount of content available to the visitor through the visitor device 304 is not yet consumed, the visitor may continue to consume the remaining portion of the content. When the entire amount of content available to the visitor through the visitor device 304 has been consumed, the process may proceed to step 940 in which the visitor, through the visitor device 304, may request that an additional amount of content be made available for access. The additional amount of content being requested may be less than or equal to the amount originally provided by the broadband gateway 102 to the visitor device 304.

At step 950, when the request for the additional amount of content is granted, the process may proceed to step 920 in which the visitor again consumes the newly available amount of content. When the request for the additional amount of content is denied, the process may proceed to step 960 in which access to content through the broadband gateway 102 to the visitor device 304 is no longer provided.

In accordance with an embodiment of the invention, aspects of a method and/or system may comprise a broadband gateway, such as the broadband gateway 102, in which content is received through one or more of the plurality of network access service providers 120. The broadband gateway 102 may enable communication with a plurality of devices, such as the home devices 104*a*-104*j* and/or the visitor device 304. The broadband gateway 102 may classify a device, such as the visitor device 304, after the visitor device 304 is communicatively coupled to the broadband gateway 102. The visitor device 304 may communicate with the broadband gateway 102 through the home network 100*a*, for example. The classification of the visitor device 304 may be performed by, for example, the processor module 204 in the broadband gateway 102. In some instances, the classification of the visitor device 304 may also require information stored in the memory module 206, such as a visitor or guest profile, for example.

The broadband gateway 102 may authorize, based on the classification of the visitor device 304, access by the visitor device 304 to a portion of the content received by the broadband gateway 102 through one or more of the network access service providers 120. The content to be accessed by the device may be selected from a plurality of content received through the plurality of network access service providers 120. The selection may be performed in response to user input, for example. Once access is authorized, the portion of the content for which access is authorized may be communicated to the visitor device 304 for the visitor to consume. Moreover, as an incentive to have visitors or guests consume the content and/or services provided through the network access service providers 120, the broadband gateway 102 may receive, from an entity associated with providing the content through the network access service providers 120, an indication of a reward associated with the authorized access by the visitor device 304. The broadband gateway 102 may process the indication of the reward, such as an electronic coupon or credit, such as to enable the reward to be redeemed.

The access authorization performed by the broadband gateway 102 may comprise receiving an identifier from the visitor device 304, communicating the identifier to an entity associated with providing the content received through the network access service providers 120, and receiving an authentication, or an indication of authentication, of the identifier from the entity. The identifier may comprise one or both of device identification information and user identification information. The device identification information may comprise a device ID and/or device characteristics such as device type, device networking capabilities, device processing capabilities, device display capabilities, and/or device audio reproduction capabilities, for example. The user identification information may comprise a user ID and/or user information such as user electronic mail address and/or user personal address, for example. In some instances, based on the classification, the visitor device 304 may be pre-authorized to access a particular portion of the content received through the network access service provider. The entity associated with access authorization may be the same or may be different from the entity associated with the indication of a reward described above.

The classification of the visitor device 304 by the broadband gateway 102 may comprise assigning to the device a level of access from a plurality of levels of access. When the visitor device 304 is a wireless device, the classification of the visitor device 304 may comprise assigning the level of access based on one or both of a signal strength and a link quality between the broadband gateway 102 and the wireless device. The signal strength and the link quality may be utilized to determine a distance between the broadband gateway 102 and the wireless device. The access authorization may comprise determining which portion of the content received through the network access service providers 120 is to be accessed by the visitor device 304 based on the level of access assigned to the device. Moreover, the authorization process may vary based on the level of access assigned to the visitor device 304.

After access is authorized for the visitor device 304, the authorized access may be disabled on or after a determined time from a time when the access was authorized. In other words, the authorized access may be time-limited. The amount of time that passes from the time the access is authorized to the time the authorized access is disabled may be based on the classification of the device. For example, the amount of time during which the authorized access is available before being disabled may vary based on the level of access assigned to the visitor device 304. Once disabled, the user may be prompted or may have some indication that the authorized access is no longer available. The broadband gateway 102 may enable the disabled authorized access by the visitor device 304 upon receiving a request to renew or enable the authorized access. The request may be sent, received, and/or processed on or before a determined time from the time the authorized access was disabled. The amount of time that is available to enable the authorized access after being such access is disabled may also be based on the classification of the visitor device 304.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for supporting visitor access via a broadband gateway.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a broadband gateway that enables communication with a plurality of devices, wherein the broadband gateway is configured to handle a plurality of physical layer connections to a plurality of corresponding network access service providers:
        classifying, via the broadband gateway, a device after the device is communicatively coupled to the broadband gateway;
        assigning, via the broadband gateway, to the device a first level of access from a plurality of levels of access based upon a classification of the device, wherein individual ones of the plurality of levels of access indicate at least one of:
    a type of content for which access is to be provided;
    a service or a content provider associated with the content;
    an authorization procedure for granting access to the content;
    a number of devices that may concurrently access the content;
    a time limit for an authorized access to the content;
    whether the authorized access to the content may be enabled once the authorized access has expired; and
    a condition that, when satisfied, permits the authorized access to be reenabled;
        authorizing, via the broadband gateway and based on the classification, access by the device to a portion of content received through one or more of the plurality of corresponding network access service providers;
        communicating, via the broadband gateway, the portion of the content for which access is authorized to the device; and
        changing, via the broadband gateway, the assigned first level of access to another of the plurality of levels of access in response to determining that the device has moved away from or closer to a location of the broadband gateway for at least a predefined amount of time, while the device maintains a communication link with the broadband gateway.

2. The method of claim 1, wherein authorizing further comprises:
    receiving an identifier from the device;
    communicating the identifier to an entity associated with providing the content that is received through the one or more of the plurality of corresponding network access service providers; and
    receiving an authentication of the identifier from the entity.

3. The method of claim 1, wherein the device is communicatively coupled to the broadband gateway via a wireless or wired connection.

4. The method of claim 1, comprising selecting the content to be accessed by the device from a plurality of content received through the one or more of the plurality of corresponding network access service providers.

5. The method of claim 1, wherein, based on the classification, the device is pre-authorized to access a particular portion of the content received through the one or more of the plurality of corresponding network access service providers.

6. The method of claim 1, wherein:
    authorizing further comprises determining which portion of the content received through the one or more of the plurality of corresponding network access service providers is to be accessed by the device based on the first level of access assigned to the device.

7. The method of claim 1, wherein:
    the device is a wireless device; and
    classifying further comprises assigning to the wireless device the first level of access from a plurality of levels of access based on one or both of a signal strength and a link quality between the broadband gateway and the wireless device.

8. The method of claim 1, further comprising disabling the authorized first level of access by the device on or after a determined time from a time when the access was authorized, the determined time being based on the classification of the device.

9. The method of claim 1, wherein the device is authorized to access a particular amount of the content received through the one or more of the plurality of corresponding network access service providers.

10. The method of claim 1, further comprising:
receiving, from an entity associated with providing the content received through the one or more of the plurality of corresponding network access service providers, an indication of a reward associated with the authorized access by the device; and
processing the indication of the reward to enable the reward to be redeemed.

11. A system, comprising:
a broadband gateway that enables communication with a plurality of devices, wherein the broadband gateway is configured to handle a plurality of physical layer connections to a plurality of corresponding network access service providers, the broadband gateway comprising circuitry configured to:
classify a device after the device is communicatively coupled to the broadband gateway according to a previously created profile stored in the broadband gateway, wherein the profile comprises a list of users who have been previously assigned a level of access to content received by the broadband gateway from one or more of the plurality of the corresponding network access service providers;
authorize, based on the classification, a first level of access by the device to content received from the one or more of the plurality of the corresponding network access service providers;
communicate the content for which access is authorized to the device; and
change the authorized first level of access to another level of access in response to determining that the device has moved away from or closer to a location of the broadband gateway for at least a predefined amount of time, while the device maintains a communication link with the broadband gateway.

12. The system of claim 11, wherein the circuitry is configured to:
receive an identifier from the device;
communicate the identifier to an entity associated with providing the content that is received through the one or more of the plurality of corresponding network access service providers; and
receive an authentication of the identifier from the entity.

13. The system of claim 11, wherein the device is communicatively coupled to the broadband gateway via a wireless or wired connection.

14. The system of claim 11, wherein the circuitry is configured to select the content to be accessed by the device from a plurality of content received through the one or more of the plurality of corresponding network access service providers.

15. The system of claim 11, wherein, based on the classification, the device is pre-authorized to access a particular portion of the content received through the one or more of the plurality of corresponding network access service providers.

16. The system of claim 11, wherein circuitry is configured to:
assign to the device the first level of access from a plurality of levels of access; and
determine which portion of the content received through the one or more of the plurality of network access service providers is to be accessed by the device based on the level of access assigned to the device.

17. The system of claim 11, wherein:
the device is a wireless device; and
the circuitry is configured to assign to the wireless device the first level of access from a plurality of levels of access based on one or both of a signal strength and a link quality between the broadband gateway and the wireless device.

18. The system of claim 11, wherein the circuitry is configured to disable the authorized first level of access by the device on or after a determined time from a time when the access was authorized, the determined time being based on the classification of the device.

19. The system of claim 11, wherein the device is authorized to access a particular amount of the content received through the one or more of the plurality of corresponding network access service providers.

20. A non-transitory computer-readable medium having a program that, when executed by circuitry located within a broadband gateway configured to handle a plurality of physical layer connections to a plurality of corresponding network access service providers, causes the circuitry to:
classify, via the broadband gateway, a device as a visitor device or a guest device after the device is communicatively coupled to the broadband gateway;
assign, via the broadband gateway, to the device a first level of access from a plurality of levels of access based upon a classification of the device;
authorize, via the broadband gateway and based on the classification, access by the device to content received through one or more of the plurality of corresponding network access service providers;
communicate, via the broadband gateway, the content for which access is authorized to the device; and
change, via the broadband gateway, the assigned first level of access to another of the plurality of levels of access in response to determining that the device has moved away from or closer to a location of the broadband gateway for at least a predefined amount of time, while the device maintains a communication link with the broadband gateway.

* * * * *